(12) United States Patent
Plonka

(10) Patent No.: US 6,933,986 B2
(45) Date of Patent: Aug. 23, 2005

(54) SHARPLY TUNED BANDPASS FILTER

(75) Inventor: Robert J. Plonka, Quincy, IL (US)

(73) Assignee: Harris Corporation, Melbourne, FL (US)

( * ) Notice: Subject to any disclaimer, the term of this patent is extended or adjusted under 35 U.S.C. 154(b) by 527 days.

(21) Appl. No.: 10/239,699

(22) PCT Filed: Apr. 5, 2001

(86) PCT No.: PCT/US01/11459

§ 371 (c)(1),
(2), (4) Date: Sep. 23, 2002

(87) PCT Pub. No.: WO01/78370

PCT Pub. Date: Oct. 18, 2001

(65) Prior Publication Data

US 2003/0227575 A1 Dec. 11, 2003

Related U.S. Application Data

(60) Provisional application No. 60/236,225, filed on Sep. 28, 2000, and provisional application No. 60/195,238, filed on Apr. 7, 2000.

(51) Int. Cl.[7] .............................................. H04N 5/50
(52) U.S. Cl. ..................... 348/732; 348/21; 348/725; 348/726; 348/728; 348/731; 348/733; 348/735; 375/350
(58) Field of Search .................. 348/21, 723, 725–726, 348/731–733, 735, 728; 375/350; 330/306, 302, 305

(56) References Cited

U.S. PATENT DOCUMENTS

| | | | | |
|---|---|---|---|---|
| 5,774,193 A | * | 6/1998 | Vaughan ..................... 348/723 |
| 5,943,012 A | * | 8/1999 | Sinclair ....................... 342/373 |
| 6,046,781 A | * | 4/2000 | LeRoy ........................ 348/731 |
| 6,061,096 A | * | 5/2000 | Limberg ..................... 348/555 |
| 6,072,363 A | * | 6/2000 | Steigenberger et al. ..... 330/126 |
| 6,166,774 A | * | 12/2000 | Plonka ........................ 348/487 |
| 6,184,921 B1 | * | 2/2001 | Limberg ...................... 348/21 |
| 6,188,446 B1 | * | 2/2001 | Aitken ........................ 348/723 |
| 6,278,498 B1 | * | 8/2001 | Neff ............................ 348/723 |
| 6,344,871 B1 | * | 2/2002 | Liu et al. ....................... 348/21 |
| 6,437,837 B1 | * | 8/2002 | Seo ............................. 348/735 |
| 6,725,463 B1 | * | 4/2004 | Birleson ..................... 725/151 |

FOREIGN PATENT DOCUMENTS

WO      0178370 A2    10/2001

* cited by examiner

Primary Examiner—Brian P. Yenke
(74) Attorney, Agent, or Firm—Tarolli, Sundheim, Covell & Tummino L.L.P.

(57) ABSTRACT

A sharply tuned bandpass RF filter is presented herein. The filter has an input port for receiving television RF signals and passing same to an output port for application to a load. The filter is tuned such that it exhibits the characteristic of passing only RF signals having frequencies within a given frequency channel out of a plurality of channels, all having the same frequency bandwidth while rejecting all other frequencies. The bandwidth of each channel is on the order of W MHz. The filter exhibits an amplitude response within a mandated mask such that when operated in an RF transmitter the amplitude of the response is attenuated uniformly about the center frequency of the given channel within a frequency range of about ±0.5W MHz to a maximum of about ±(0.5W+0.45) MHz and extending to an attenuated level of about −1 to −18 dB from the in-band power level.

17 Claims, 14 Drawing Sheets

BACKGROUND

BACKGROUND

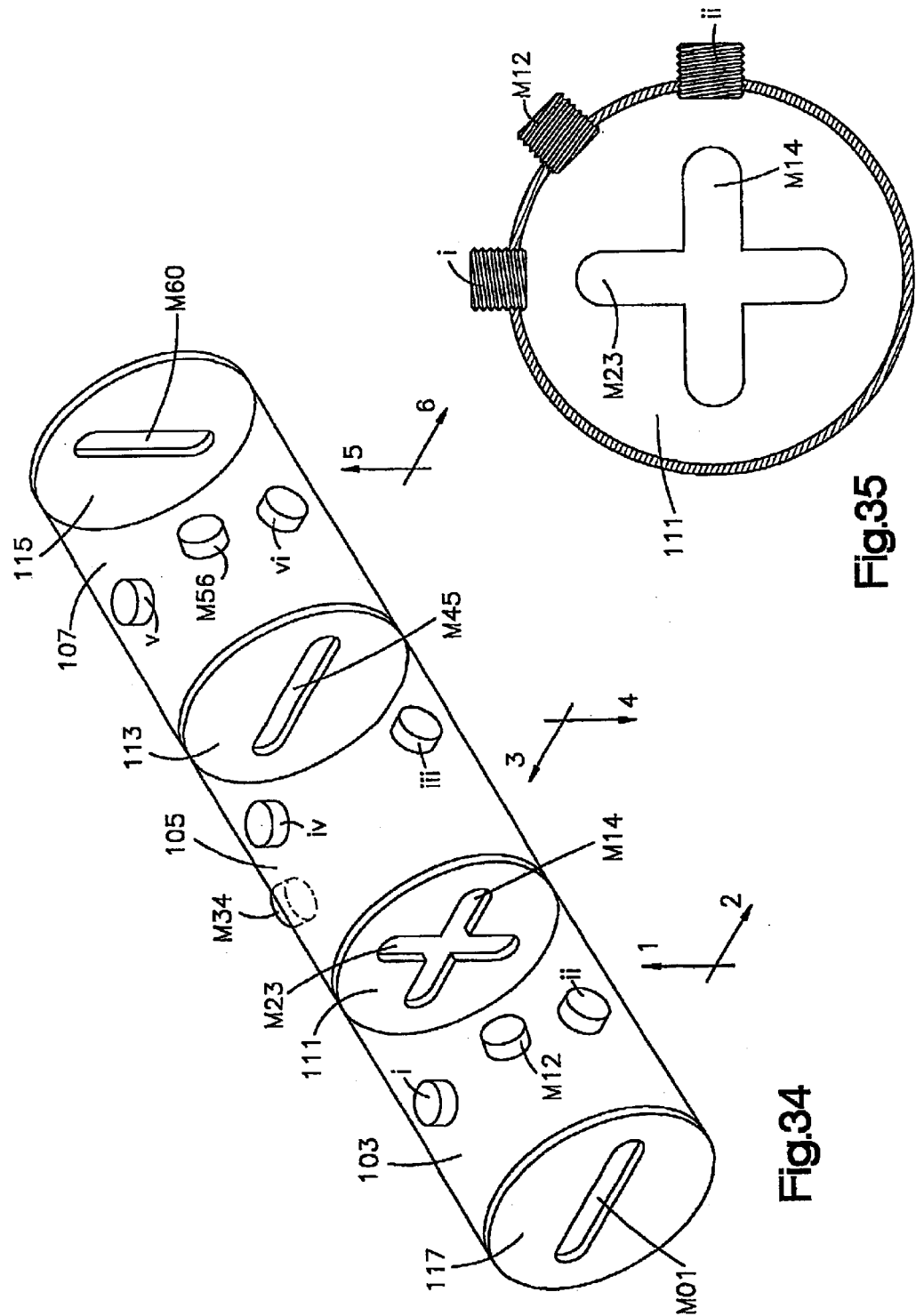

SHARPLY TUNED BANDPASS FILTER

RELATED APPLICATIONS

This application claims the benefit of U.S. Provisional Application Ser. No. 60/195,238 filed Apr. 7, 2000 and U.S. Provisional Application Ser. No. 60/236,225 filed Sep. 28, 2000.

BACKGROUND OF THE INVENTION

The present invention relates to radio frequency (RF) bandpass filters and, more particularly, to a sharply tuned bandpass filter that may be employed as a stand alone filter or may be employed as part of a filter-combiner system.

DESCRIPTION OF THE PRIOR ART

Television signals have traditionally been broadcast in an analog format known as NTSC. The Federal Communications Commission (FCC) is now permitting a new digital format known as DTV. The digital format is presently in operation and the FCC has provided a transitional period until the year 2006 during which the NTSC signals and the DTV signals will both be transmitted. Thus, a station will simulcast both an NTSC signal and a DTV signal. It is understood that the FCC has allocated frequency bands or channels wherein an NTSC signal will be adjacent a DTV signal and also that a DTV signal will be adjacent to another DTV signal. In the United States, the channels are all 6 MHz wide, whereas in other parts of the world the channels are 6–8 MHz wide. The discussion presented herein is specifically directed to channels that are 6 MHz wide although it is to be understood that the discussion may be similar for channels that are up to 8 MHz wide.

When a DTV allocation is one channel below an NTSC channel, this is referred to as the N−1 case. When the DTV allocation is one channel above an NTSC channel, this is referred to as the N+1 case.

To prevent adjacent channels from interfering with each other, it has been known in the past to employ bandpass filters and hybrid couplers, simply referred to herein as hybrids, to form bandpass filter-combiners. Bandpass filter-combiners are described in a four page article entitled, *Adjacent Channel Combining for N+1 DTV Channel Allocations*, in the ADC Technical News Publication, dated Jul. 30, 1998 published by ADC Telecommunications, Inc. FIG. 1 herein is based on FIG. 1 in that publication and presents a bandpass filter-combiner employing a pair of bandpass filters 10 and 12 interposed between hybrids 14 and 16. One of the input ports of hybrid 14 is coupled to a reject load 18 and the other input receives an RF signal A. Another RF signal B is supplied to a port on filter 16. The bandpass filters 10 and 12 are tuned to pass signal A but reflect signal B. Consequently, signal A enters the left side port of hybrid 14 and the signal splits into portions which pass through the bandpass filters 10 and 12 and thence into the hybrid 16 and combine with signal B. Signal B entered the hybrid and then split with portions reflecting off the bandpass filters 10 and 12 and returning into the hybrid to combine with signal A to provide a combined signal A+B at an output port of hybrid 16. The article points out that the filter-combiner of FIG. 1 is not practical for use in an N+1 case wherein the DTV channel is above the NTSC channel. This is because the aural carrier in the N+1 case is only 0.25 MHz away from the upper channel edge, and may have sidebands up to 120 kHz away. Thus, the guard band is very small.

The ADC article proposes a design for the N+1 case and this takes the form shown herein at FIG. 2 which is based on FIG. 5 in the ADC article. FIG. 2 herein shows a constant-impedance filter-combiner 20 in combination with a notch diplexer 22. The constant impedance filter-combiner 20 is based on that illustrated herein at FIG. 1 and, consequently, like components are identified with like character references. Signal A is replaced with a DTV signal and signal B is replaced with a VISUAL signal from an NTSC signal. The AURAL signal has been removed and, as will be seen, is re-inserted downstream. The bandpass filters 10 and 12 are tuned to pass the DTV signal and reflect the VISUAL signal. The output port will provide a combined signal including the DTV signal and the VISUAL signal. This signal is then supplied to the notched diplexer where the AURAL signal is re-inserted. The notched diplexer is tuned to reject or reflect the AURAL signal and to pass the combined DTV and VISUAL signals obtained from the filter-combiner 20. The notched diplexer includes a left hybrid 24 having an input port for receiving the combined signal from the filter-combiner 20 and another input port connected to a load 26. The notched diplexer includes a pair of aural notch filters 28 and 30 that extend from the left hybrid 24 to a right hybrid 32. The AURAL signal is supplied to a port 34 of hybrid 32 and the AURAL signal is then split and portions reflected back from filters 28 and 30 so that the AURAL signal combines with the DTV and VISUAL signals and the combined signal appears at an output port 36 for application to an antenna 38. It is to be noted that most notched diplexers also include −3.58 MHz traps in series with the AURAL notched filters, such as filters 28 and 30 in FIG. 2, to provide attenuation of unwanted color difference products in the lower sideband. For simplicity, such traps have not been included in FIG. 2.

By splitting the NTSC signal into its VISUAL and AURAL components, the prior art presented in FIG. 2 requires that the AURAL signal be added down stream. Consequently, in order to handle the N+1 case, this type of prior art requires a circuit having three inputs for receiving the DTV, VISUAL, and AURAL signals. Additionally, this circuit requires the use of four hybrids 14, 16, 24 and 32. It is desirable to reduce the cost of the equipment needed to handle an N+1 case.

Attention is now directed to FIG. 3 which illustrates another prior art circuit for handling the N+1 case. This circuit includes only two hybrids 40 and 42 as opposed to the four hybrids employed, in the circuit of FIG. 2. The left hybrid 40 has an input port connected to a load 41 and a second input port that receives a DTV signal by way of a power amplifier 44. The DTV signal splits as it enters the hybrid 40 and a portion of it is passed by a DTV bandpass filter 46 and another portion is passed by a DTV bandpass filter 48. These DTV portions are passed by AURAL notches 50 and 52 and then enter the right hybrid 42. An NTSC signal that includes both AURAL and VISUAL components is supplied to a port on the right side of hybrid 42 and these signals split in the hybrid and the AURAL portions are reflected from the AURAL notches 50 and 52 and are passed back through the hybrid and recombined and are applied to an antenna 60. The VISUAL portions of the NTSC signal pass through the AURAL notch cavities of the AURAL notches 50 and 52 and are reflected by the DTV bandpass filters 46 and 48 and return through the AURAL notches 50 and 52 and thence into the right hybrid 42 and combine with the DTV and AURAL signals and supplied to the antenna 60. Whereas the circuit of FIG. 3 only has two hybrids, it is to be noted that the NTSC VISUAL signal passes over the AURAL notches twice during the operation adding a heat burden to the AURAL cavities. Any temperature drifting will-cause performance parameters to fall outside the equalization set up because there is no tracking adaptive system in NTSC. Also, it is to be noted that a notch diplexer type combiner as shown in FIG. 3 results in reduced DTV to NTSC chroma isolation. Additionally, the AURAL notch causes equalization problems for the transmitter system because the notched bandwidth can cut back into the NTSC chroma region which causes additional high frequency video equalization adjustments.

From the foregoing discussion of the prior art circuits of FIGS. 1, 2 and 3, it is seen that an improvement is needed in the bandpass filters that are employed in these combiners. A more sharply tuned filter is needed that will pass the DTV signal for a particular channel while reflecting all other frequencies including an adjacent channel NTSC signal or an adjacent channel DTV signal. The filter should exhibit an amplitude response within a mandated mask (such as the FCC mandated mask). Such a sharply tuned filter can be used as a stand alone filter having deep levels of IMD sideband rejection at the channel edges for additional FCC mask suppression. This enhances transmitter performance so that the transmitter power may be increased substantially while meeting the requirements of the FCC mandated mask.

In addition to operating as a stand alone mask filter resulting in power enhancement, such sharply tuned filters may be employed in a constant impedance filter-combiner without the need for notched filters for the AURAL carrier signal and, hence, such a combiner may be employed in the N+1 case as well as in the N−1 case as well as for adjacent channel DTV signals.

SUMMARY OF THE INVENTION

In accordance with one aspect of the present invention, a sharply tuned bandpass RF filter is provided. The filter has an input port for receiving digital television RF signals and passing same to an output port. The filter is tuned such that it exhibits the characteristic of passing only RF signals having frequencies within a given frequency channel out of a plurality of channels, all having the same frequency bandwidth while rejecting all other frequencies. The bandwidth of each channel is on the order of W MHz (wherein W may be on the order of 6 MHz for the United States and on the order of 6 to 8 MHz for other parts of the world). The filter exhibits an amplitude response within a mandated mask (such as the FCC mandated mask) such that when operated in an RF transmitter the amplitude of the response is attenuated uniformly about the center frequency of the given channel within a frequency range of about ±0.5W MHz to a maximum of about ±(0.5W+0.45 ) MHz and extending to an attenuated level of about −1 to −18 dB from the in-band power level.

BRIEF DESCRIPTION OF THE DRAWINGS

The foregoing and other objects and advantages of the present invention will become more readily apparent from the following as taken in conjunction with the accompanying drawings wherein:

FIG. 34 is an enlarged perspective view of the filter that also illustrates adjustment screws (probes); and FIG. 35 is a sectional, view showing iris plate 111.

DESCRIPTION OF PREFERRED EMBODIMENTS

Figure 4:
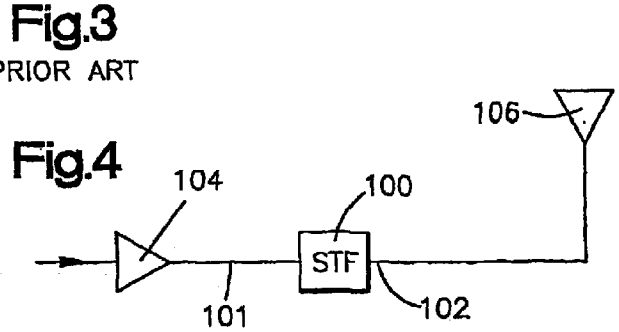
FIG. 4 is a block diagram illustration of a sharp tuned filter constructed in accordance with the present invention and illustrated in combination with an amplifier and an antenna.

Reference is now made to FIG. 4 which illustrates a sharp tuned filter (STF) 100 constructed in accordance with the present invention and which is illustrated as having a single input port 101 and a single output port 102. The input port is illustrated as being connected to the output of an amplifier 104 which, for example, may receive and amplify a digital DTV signal for a particular channel, such as channel 10. The DTV signal is applied to the sharp tuned filter 100 which is tuned to pass only signals in this channel, i.e. channel 10 in the example being described. The passed DTV signal is then provided at the output port 102 and forwarded to a load, such as an antenna 106 for broadcasting purposes.

Figures 30, 31, 32, 33:
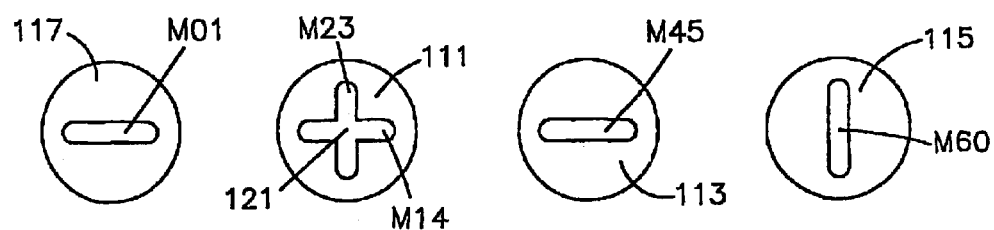
FIG. 30 is a view taken along line 30—30 looking in the direction of the arrows in FIG. 29 and illustrating the configuration of the input port of the waveguide.
FIG. 31 is a view taken along line 31—31 looking in the direction of the arrows in FIG. 29 illustrating an iris plate.
FIG. 32 is a view taken along line 32—32 looking in the direction of the arrows in FIG. 29 illustrating another iris plate.
FIG. 33 is a view taken along line 33—33 looking in the direction of the arrows in FIG. 29 and showing a still further iris plate.

It is to be understood that the load may take a form other than an antenna. The filter 100 may take various forms such as a length of coaxial cable or a wave guide. The structural configuration may take these or other forms so long as the filter complies with the specifications noted below and given with reference to the graphical illustrations in FIGS. 5 and 6. For example, the filter 100 may take the form of waveguide 101 shown in FIGS. 29–33. This waveguide is a hollow cylinder constructed of suitable conductive metal, such as aluminum, copper or steel. The waveguide may have multiple cavities, such as cavities 103, 105 and 107 defined by iris plates 111, 113, and 115. The iris plates and the three sections of the waveguide may be held together as with welding or bolt and nut arrangements. The waveguide has an input port 117 and an output port. The input port is of rectangular shape, as indicated at FIG. 30. The iris plates have iris openings of various shapes. For example, the iris opening in plate 111 is a cross 121 as shown in FIG. 31. The iris opening in plate 113 is a horizontal slot M45 as shown in FIG. 32. The iris opening in plate 115 is a vertical slot M60. As best shown in FIGS. 34, 35, the waveguide 101 also has mode resonance screws i–vi and mode coupling screws M12, M34 and M56 that protrude into the cavities. These screws (or probes) are made of metal, such as copper, and extend into the cavities by various amounts, such as in the range from 0.25 inch to 0.50 inch for a circular waveguide having an inner diameter on the order of 20.0 inches. Note that cavity 103,is for mode resonance numbers 1, 2 and that cavity 105 is for mode resonance numbers 3, 4 and that cavity 107 is for mode resonance numbers 5, 6. The cross, 121 includes slot M14 that couples resonances 1 and 4 and slot M23 that couples resonances 2 and 3. The horizontal slot M45 couples resonances 4 and 5.

The filter sections are realized thorough distributed capacitances and inductances through the use of the circular waveguide cavity sections separated by conductive iris plates. The size of the cavities is such that two modes (such as modes 1, 2 or 3, 4 or 5, 6) are allowed to propagate through the waveguide (as opposed to the propagation of only the dominant mode).

Figure 5:
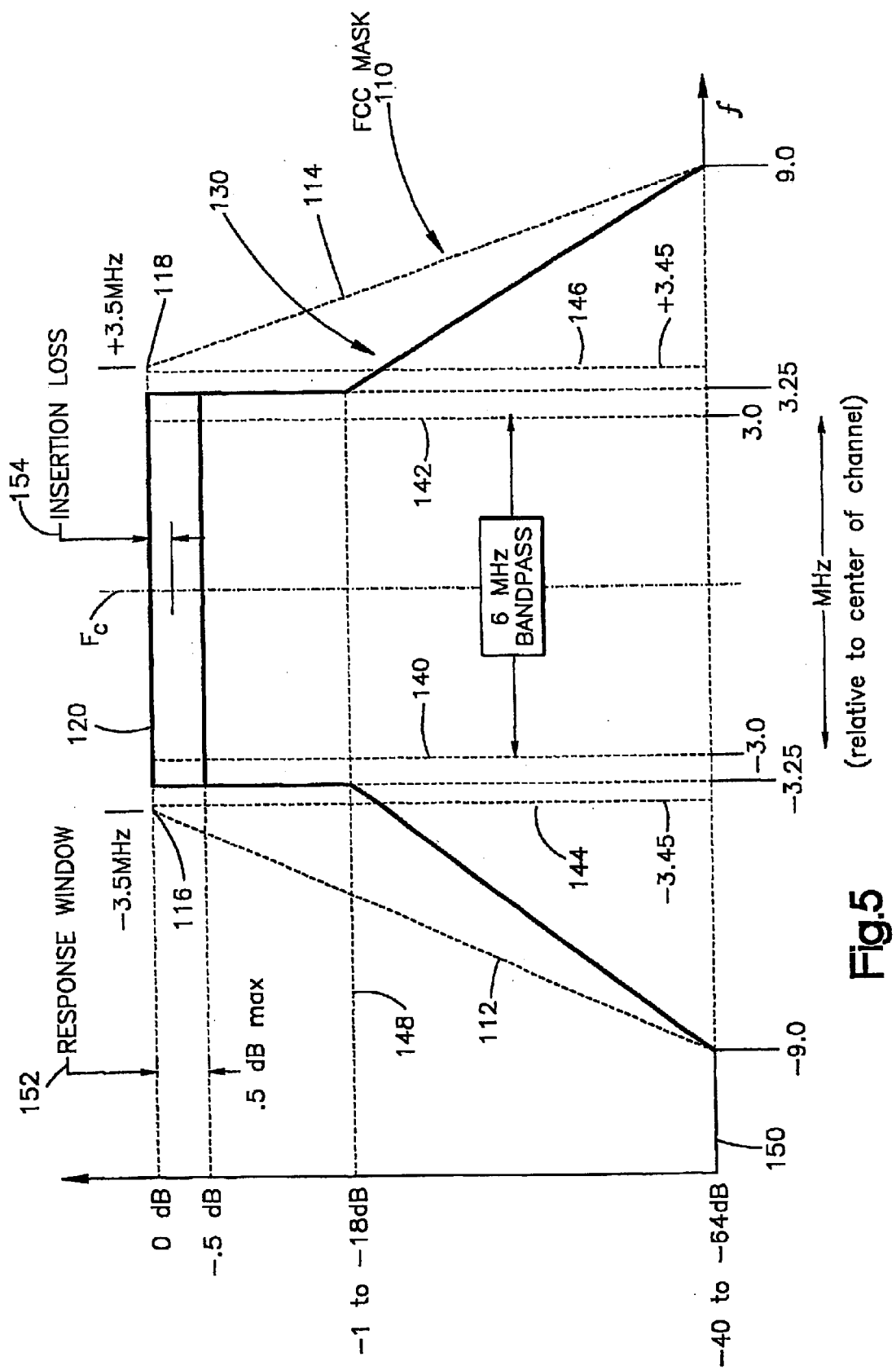
FIG. 5 is a graphical illustration of amplitude with respect to frequency and illustrating typical filter specifications for amplitude response and also including the FCC mask and the sharp tuned filter mask herein.
Figure 6:
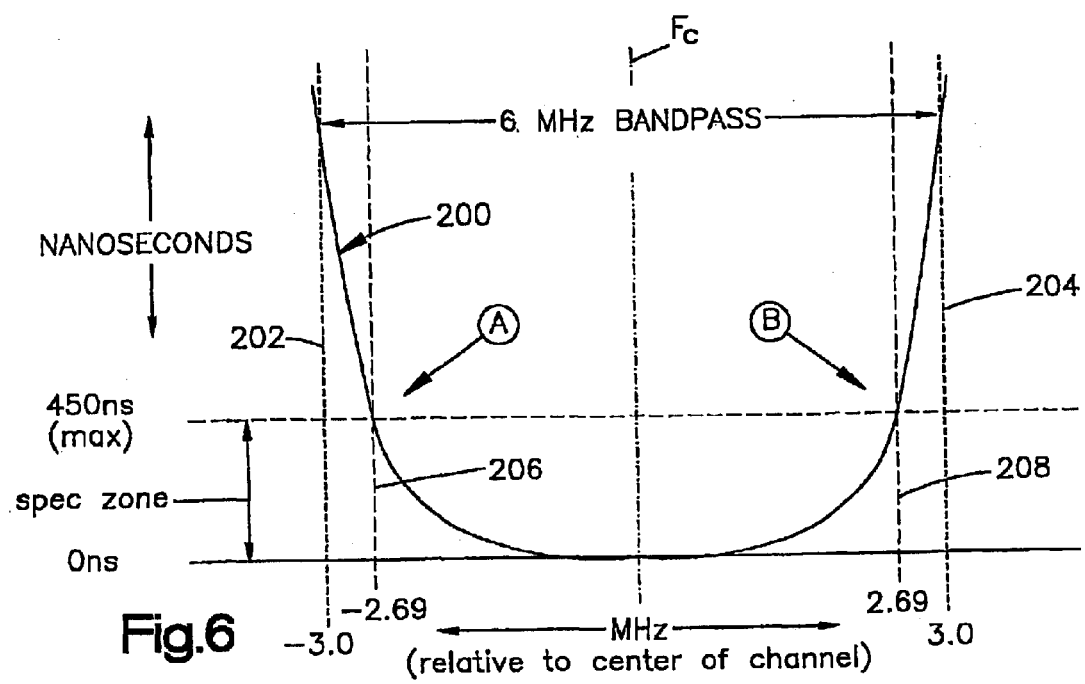
FIG. 6 is a graphical illustration of time in nanoseconds versus frequency and illustrating typical filter specifications with respect to group delay.

The filter is tuned during construction to comply with the specifications set forth in FIGS. 5 and 6. The tuning includes varying the length and inner diameter of the waveguide and varying the shape and size of the iris openings and the orientation of the openings relative to each other. The waveguide may be on the order of 6 feet in length and about 20 inches in inner diameter. Additional tuning during filter construction involves adjusting the screws (probes) i–vi and M12, M34 and M56. For example a first adjustment may be made as to the depth that these screws protrude into the waveguide cavities. Then a test maybe made by applying RF energy of the frequency channel of interest and then a determination is made with suitable meters (such as a spectrum analyzer) as to the filter response relative to the FCC mask. This step may be repeated until the response meets the specifications herein. The adjustment of the mode resonance screws i–vi change the resonant frequency in the associated cavity. The filter bandwidth is changed by adjusting the three mode coupling screws M12, M34 and M56. Deeper screw penetration provides greater mode coupling. This increases filter bandwidth. The opposite adjustment decreases filter bandwidth.

In FIG. 5 there is illustrated, in dotted lines, the FCC mask 110 for DTV signals sometimes known as the 8VSB standard or the 8VSB modulated RF signal. The Federal Communications Commission (FCC) has mandated that each television channel have a bandwidth of 6 MHz whether the channel be a DTV channel or an NTSC channel. The FCC mask 110 requires that all signals broadcasted have their power attenuated starting at frequencies no greater than ±3.5 MHz relative to the center frequency $F_c$ of the assigned channel. The attenuation is complete. The FCC mask, as shown in FIG. 5, requires that the attenuation be continuous within the mask. The mask has left and right skirts 112 and 114 that extend in a linear fashion from mask edges 116 and 118 from the in-band power level 120 to −64 dB at ±9 MHz relative to the center frequency $F_c$. The in-band power level 120 will sometimes be referred to herein as the reference level.

The filter 100, in accordance with the present invention, complies with and falls within the mandated FCC mask as is indicated herein by the solid line 130 representing the filter mask of filter 100. This shows the amplitude response of the filter. The vertical dashed lines 140 and 142 represent the 6 MHz bandpass from −3.0 to +3.0 MHz relative to the center line frequency $F_c$ that must be passed by the filter.

Attenuation of signals beyond ±3.0 MHz up to about ±3.45 MHz, as indicated by the dashed lines 144 and 146, is achieved by the filter 100. This attenuation is uniform about the center frequency extending downward to an attenuated level as indicated by the horizontal dashed line 148 and this attenuated level is at about −1 to −18 dB from the in-band power level 120. From this attenuated level, the amplitude response is further attenuated in a skirt like fashion to a level 150 of about −40 dB to −64 dB at ±9 MHz relative to the center line frequency $F_c$.

There may be some amplitude ripple at the in-band power level 120 however this should stay within a response window 152 and not exceed about −0.5 dB below the in-band power level 120. Additionally, the insertion loss 154 should not exceed about −0.20 dB from the in-band power level 120.

Reference is now made to FIG. 6 which presents a graphical illustration of time with respect to frequency showing the group delay as represented by curve 200 within the 6 MHz bandpass as represented by vertical dashed lines 202 and 204 at −3.0 and +3.0 MHz relative to the center frequency $F_c$. Points A and B are taken at −2.69 and +2.69 MHz relative to the center frequency $F_c$ as indicated by the vertical dashed lines 206 and 208. These lines 206 and 208 intersect curve 200 at points A and B which are to be kept within 50 nanoseconds of each other.

The specifications of the filter 100 as presented in FIGS. 5 and 6 and as discussed above have been presented relative to the standards in the United States wherein the FCC has allocated television channels as being 6.0 MHz wide. The European and other non-U.S. standards differ somewhat and, for example, the bandpass filter must be modified to pass frequencies on the order of 6 to 8.0 MHz which is the channel width or bandwidth in other parts of the world. Consequently, if the bandwidth of each channel is designated as being on the order of W MHz, then W may be 6 for the United States and 6 to 8 MHz for other parts of the world.

The filter described herein with respect to FIGS. 4, 5 and 6 may be employed as a stand alone mask filter with deep levels of IMD sideband rejection on the channel edges. Such a stand alone mask filter is illustrated in FIG. 4 and the operation is described herein in greater detail with reference to FIG. 27. Such a stand alone mask filter enhances transmitter performance by reducing the linearity requirements to meet the FCC mask and allows higher power transmitter operation for improved power output. As such the filter provides greater out-of-channel protection to guard against potential NTSC interference which, in many cases, could be the same NTSC station due to current adjacent channel allocations.

Figure 7:
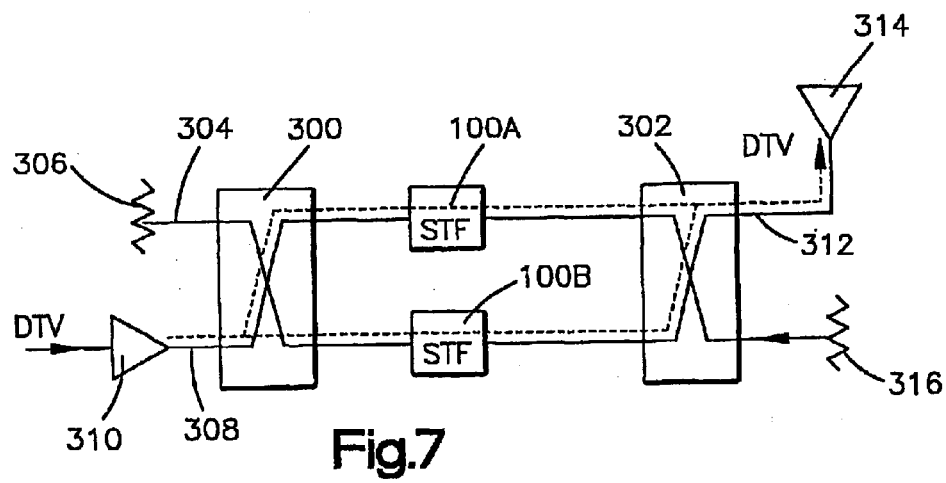
FIG. 7 illustrates an embodiment of the invention herein employing two sharply tuned filters and two hybrids employed for supplying an amplified DTV signal to an antenna for broadcasting.

Additionally, the filter 100 as described relative to FIGS. 4, 5 and 6, may be employed in conjunction with another filter in a stand alone filter mask in the manner as set forth in FIG. 7. There, a pair of filters 100A and 100B, of identical construction to each other and to filter 100, are interposed between a left hybrid 300 and a right hybrid 302. The filters 100A and 100B are tuned to pass the frequency channel of the DTV signal. The left hybrid 300 has an input port 304 connected to a load 306 and a second input port 308 that receives an amplified DTV signal from an amplifier 310. The DTV signal enters the hybrid 300 and is split into two paths, one extending through the filter 100A and the other passing through filter 100B. The two signals enter the right hybrid 302 where they combine and provide a DTV signal at the output port 312 for application to an antenna or load 314. Another port on the right hybrid 302 is connected to a load 316. As will be discussed in greater detail hereinafter with reference to FIG. 27, such a circuit will easily meet the FCC sideband suppression levels while allowing operation of the transmitter at a substantially higher power level. This will be discussed in greater detail hereinafter with reference to FIG. 27.

Figure 8:
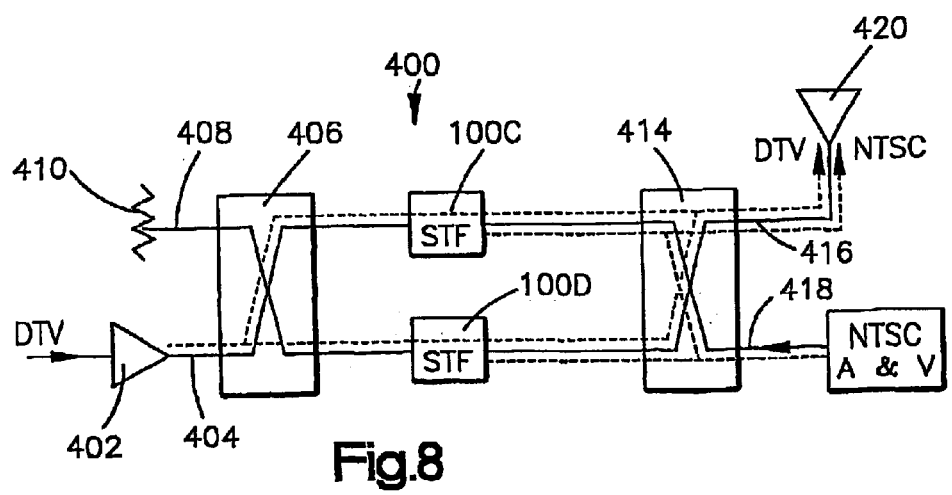
FIG. 8 is a block diagram illustration of an embodiment of the invention herein for performing adjacent channel combining of an NTSC signal and a DTV signal in an N+1 case or an N−1 case.

Attention is now directed to FIG. 8 which illustrates a constant impedance filter-combiner 400 constructed in accordance with the present invention and employing a pair of filters 100C and 100D each constructed in the same manner as filter 100. Each filter 100C and 100D is tuned to pass television RF signals within a particular channel while rejecting all other RF frequencies. In the example being presented, the mode of operation is for the N+1 case. Consequently, the DTV signal is from a channel of higher frequencies than the NTSC signal. For example, the DTV channel may be that for channel 10 (192 MHz to 198 MHz) and NTSC channel may be channel 9 (186 MHz to 192 MHz). In this example, both filters 100C and 100D are tuned to pass the DTV signal (channel 10) while rejecting all other RF frequencies. The DTV signal is supplied to a power amplifier 402 and, thence, to an input port 404 at the left side of a hybrid 406. Another input port 408 of hybrid 406 is connected to a reject load 410. The DTV signal enters the hybrid 406 at the input port 404 and then is split into two portions which are respectively passed by the filters 100C and 100D and enter a right hybrid 414 and are recombined and are supplied to an output port 416. The NTSC signal, including both audio and video components, is supplied to a port 418 on the right side of hybrid 414. The signal is then split in the hybrid 414 and portions exit from the left side of hybrid 414 and are reflected from the filters 100C and 100D and reenter the hybrid 414 and recombine along with the recombined DTV signal and are provided at output port 416 and applied to a road such as antenna 420. The hybrids in FIGS. 7 and 8 may be zero degree or ninety degree hybrids.

Figure 1:
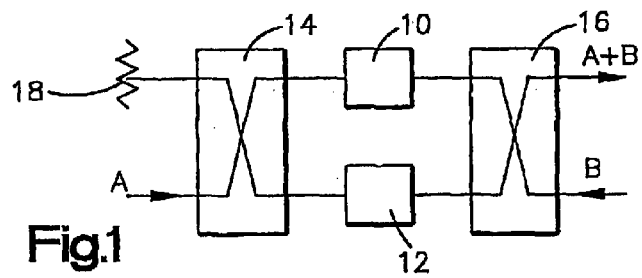
FIG. 1 is a block diagram illustration of a bandpass filter-combiner in accordance with the prior art.
Figure 2:
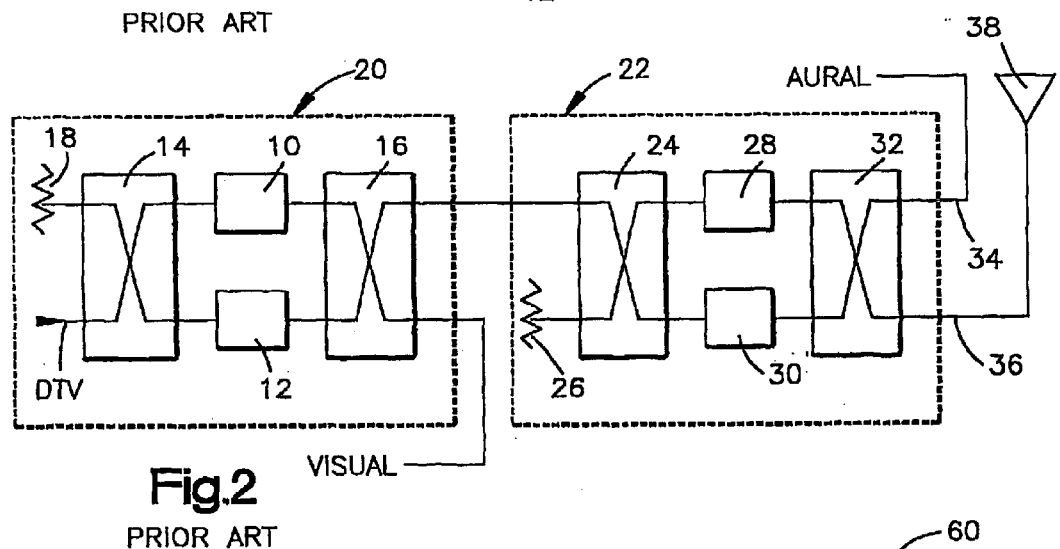
FIG. 2 is a block diagram illustration of another bandpass filter-combiner in combination with a notch diplexer in accordance with the prior art.
Figure 3:
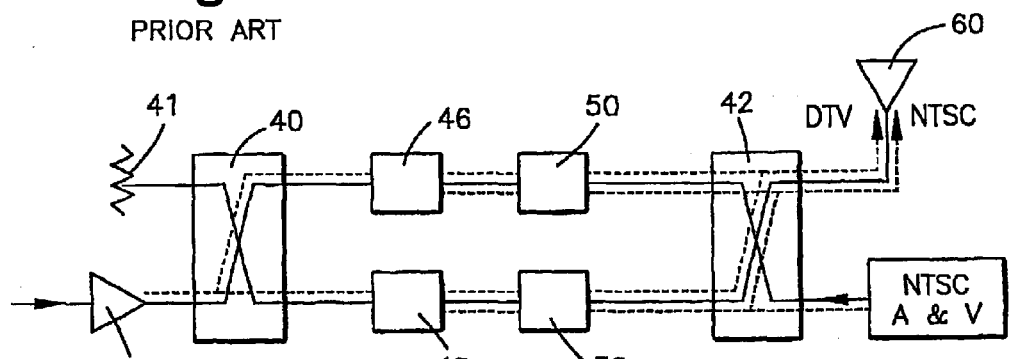
FIG. 3 is a notch type combiner also in accordance with the prior art.

The filter-combiner presented in FIG. 8 requires only two hybrids and only two input ports (404 and 418) as opposed to the construction of the prior art filter-combiner in FIG. 2 that requires four hybrids and three input ports. Moreover, by providing such sharp tuned filters as filter 100C and 100D, there is no need to provide AURAL notches such as AURAL notches 50 and 52 in the prior art filter-combiner of FIG. 3.

Figure 9:
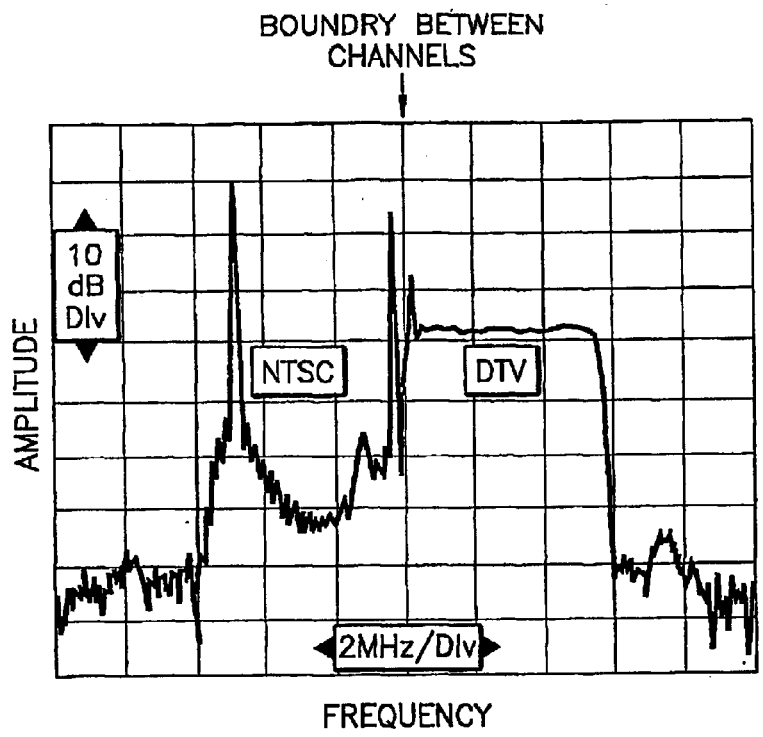
FIG. 9 is a graphical illustration of amplitude with respect to frequency showing the operation of the embodiment in FIG. 8 for adjacent NTSC and DTV channels in the N+1 case.
Figure 10:
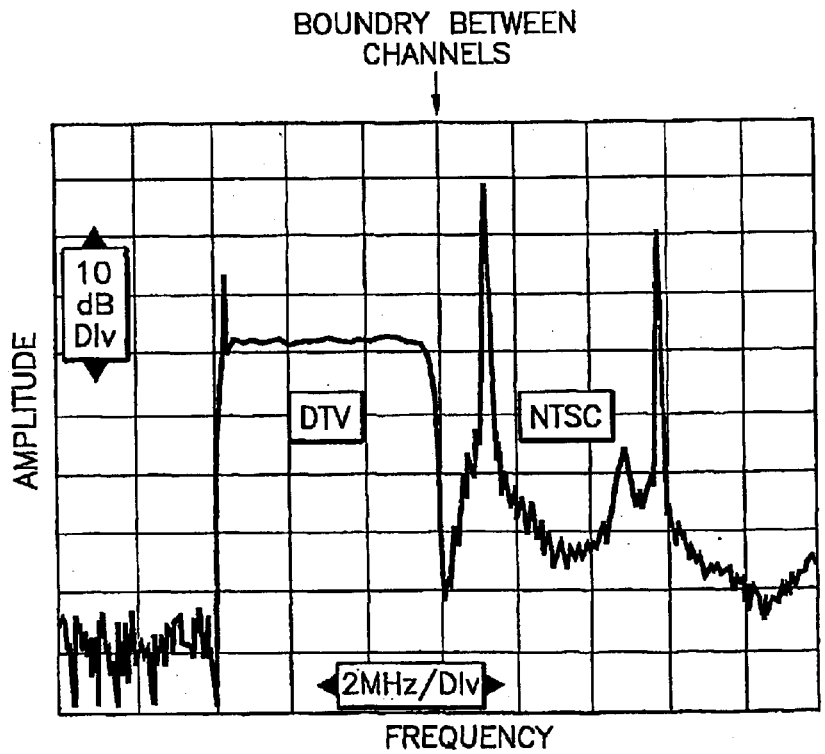
FIG. 10 is a graphical illustration of amplitude with respect to frequency showing the operation of the embodiment in FIG. 8 for adjacent NTSC and DTV channels in the N−1 case.

FIGS. 9 and 10 illustrate radiation patterns of amplitude with respect to frequency for the N+1 case and the N−1 case, respectively. Thus, in the N+1 case as shown in FIG. 9, the NTSC signal is in the lower frequency channel, such as channel 9, and the DTV signal is in the adjacent higher frequency channel. This is a spectrum analyzer presentation and it shows low DTV power which is normal.

The filter-combiner of FIG. 8 may also be employed in the N−1 case, as shown in FIG. 10, such as wherein the DTV signal is the lower channel, such as channel 10, and the NTSC signal is in a higher channel, such as channel 11 (198 MHz to 204 MHz) Both FIGS. 9 and 10 show the radiation patterns as measured and each division in the vertical direction represents 10 dB and each division in the horizontal direction represents 2 MHz.

Figure 11:
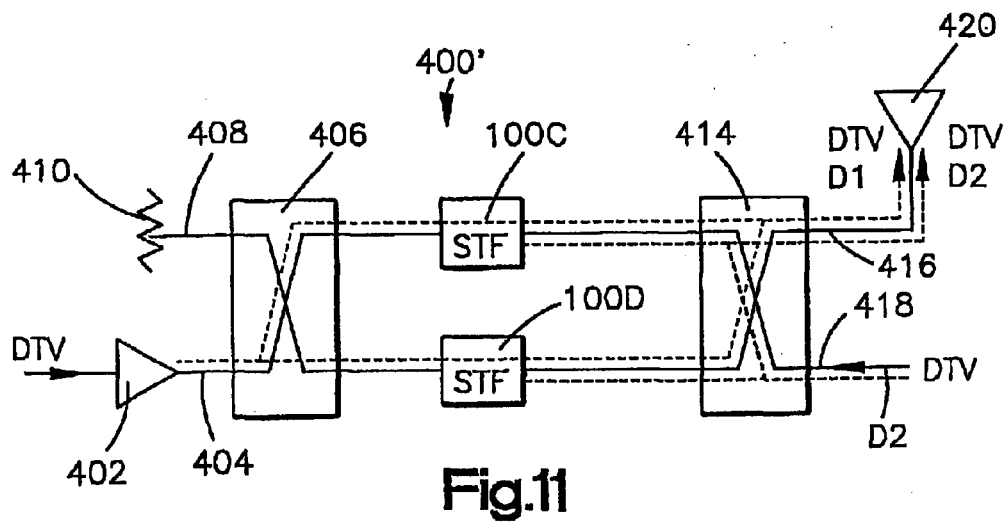
FIG. 11 is similar to that of FIG. 8 but employed for combining adjacent channel DTV signals.
Figure 12:
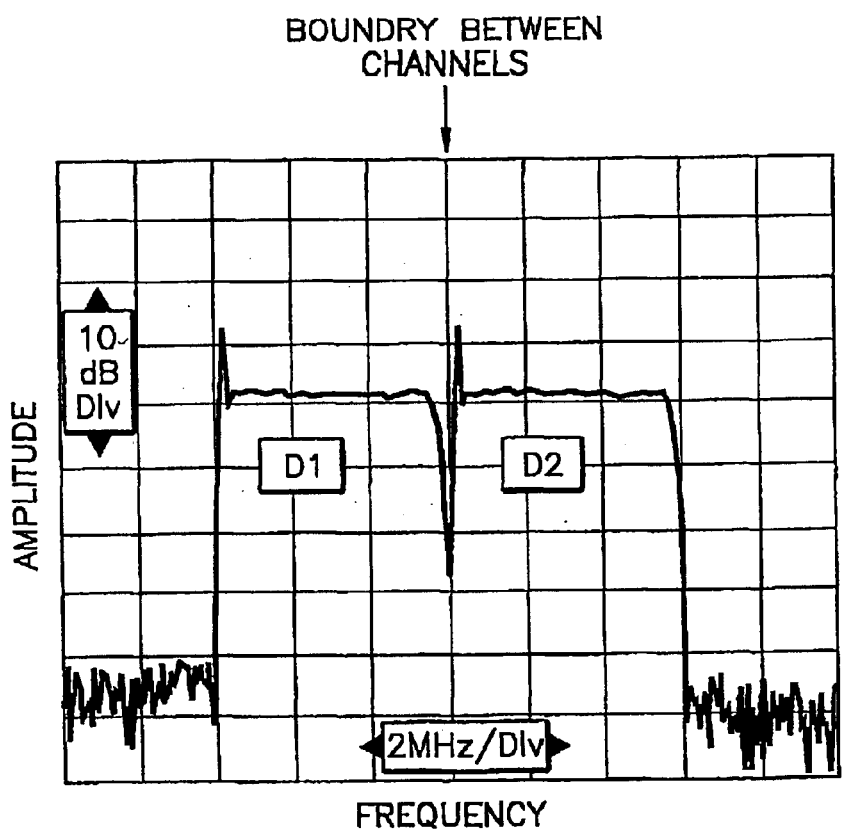
FIG. 12 is a graphical illustration of amplitude with respect to frequency showing the operation of the circuitry in FIG. 11 with respect to adjacent DTV channels.

Reference is now made to FIG. 11 which illustrates a combiner 400' which is virtually identical to combiner 400 and consequently like components are identified with like character references. The significant difference is that this combiner combines two DTV signals, one represented as D1 which is applied through amplifier 402 to the input port 404 of the left hybrid 406 in the same manner as discussed hereinbefore with reference to FIG. 8. In the case of FIG. 11 the DTV signal D1 passes through the hybrids 406 and 414 and the filters 100C and 100D as indicated by the dashed lines in the same manner as the discussion presented above with reference to FIG. 8. The filters 100C and 100D are tuned to pass only the DTV signals in the channel for the digital signal D1 (channel 10 192 MHz to 198 MHz) and reject all other frequencies. The second digital signal D2 may be from an adjacent channel which, is either higher or lower than that of channel 10. In the event that it is of a higher frequency then it will be from channel 11. Since the filters 100C and 100D are tuned to reject such frequencies, the signal D2 will be split as it enters the right hybrid 414 and the split portions are reflected from filters 100C and 100D and pass back through the hybrid, as indicated by the dotted lines and combine with the digital signal D1 for application to the antenna or load 420. An amplitude versus frequency spectral plot for typical adjacent DTV channels is illustrated in FIG. 12.

Figure 13:
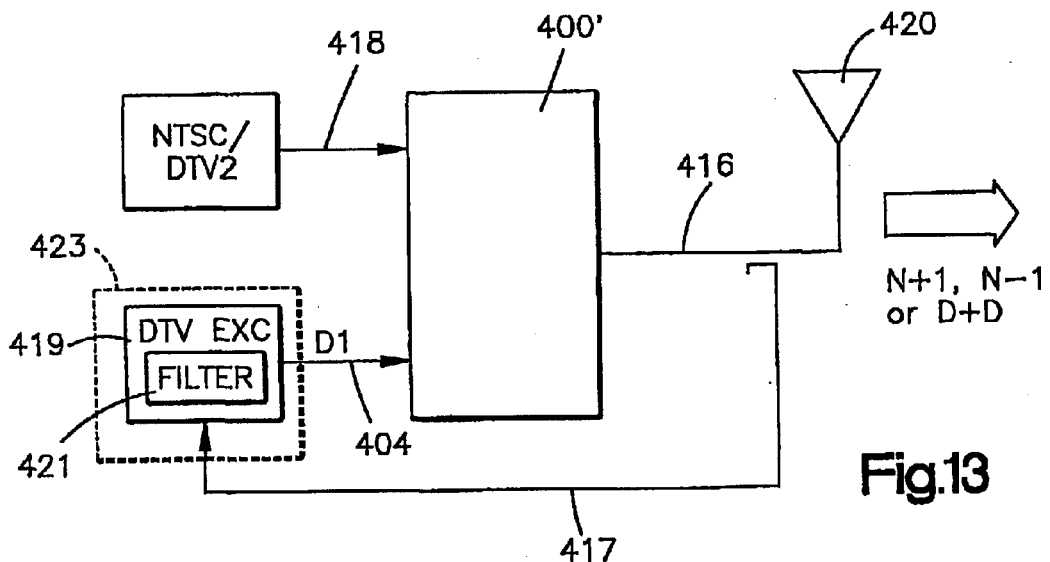
FIG. 13 is another embodiment of the invention employing adaptive equalization RF sample feedback.

Reference is now made to FIG. 13 which is similar to FIGS. 8 or 11 in that it employs a filter-combiner 400' and may operate in an N+1, N−1 or a D+D configuration. As illustrated, a DTV transmitter 423 with an exciter 419 supplies a digital signal D1 to input port 404 and either an NTSC signal or a second DTV signal is supplied to input port 418 and the output is obtained from output port 416 and supplied to an antenna 420. An adaptive feedback path 417 provides feedback to the DTV exciter 419. A digital filter 421 at the input to the exciter 419 removes any interference that may be obtained from the NTSC signal or the second DTV signal. The exciter includes pre-correction circuitry that pre-corrects the information signal supplied to antenna to correct for any distortion caused by the filters in the combiner-filter 400'. The pre-correction may be for both non-linear and linear distortions. Preferably the correction is for at least any linear distortion introduced by the filters in the filter-combiner 400'. As shown, the correction may be adaptive with a feedback path. The correction may also be non-adaptive, without the feedback path.

Figure 14:
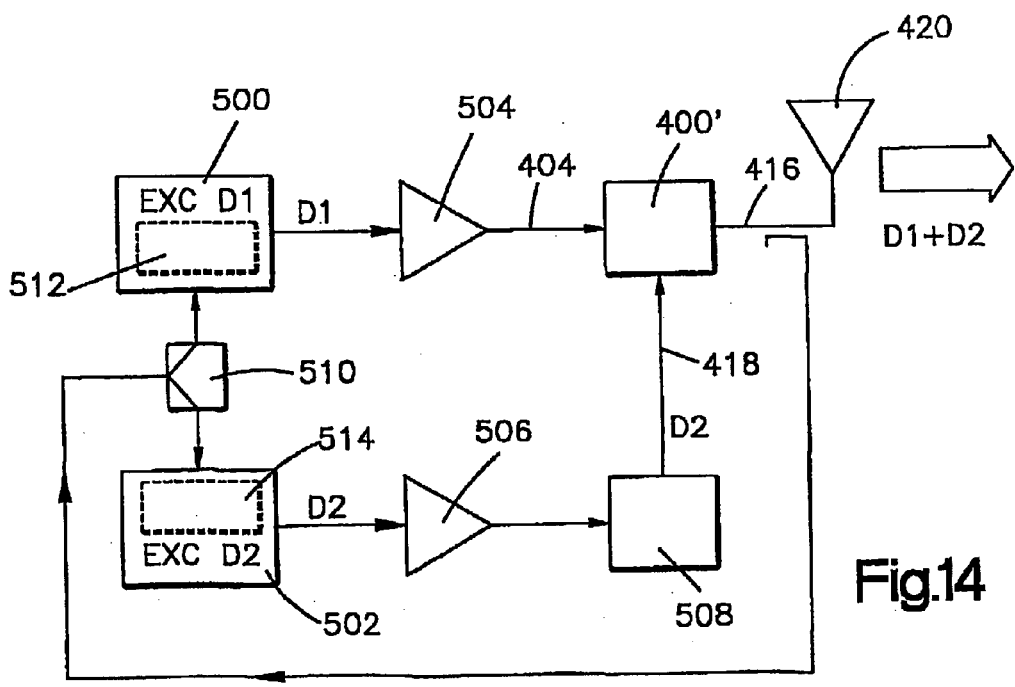
FIG. 14 is another embodiment of the invention similar to that as illustrated in FIG. 13, but including additional features.

Reference is now made to FIG. 14 which illustrates another embodiment of the invention similar to that with reference to FIG. 13 and which may be used when transmitting two DTV signals referred to herein as signals D1 and D2. For purposes of illustration assume that D1 is the lower frequency signal and D2 is the higher frequency signal. This embodiment employs a pair of exciters 500 and 502 which supply the D1 and D2 signals to a pair of amplifiers 504 and 506. The amplified D1 and D2 signals are supplied to a filter-combiner, such as combiner 400' from FIG. 11. The D1 signal is supplied to input port 404 and the D2 signal is applied through the filter 508 and thence to input port 418. The filter 508 is employed for passing the D2 signal and rejecting all other RF signals and then the signal is applied to the filter-combiner. The output signal which includes the combined D1 and D2 signals is supplied from the output port 416 to the antenna 420. In this embodiment, a sample is taken of the output signals D1 and D2 and fed back to the exciters 500 and 502 with the use of a signal splitter 510. Each of the exciters is provided with a filter to remove interference from the non-related exciter. Thus exciter 500 is provided with a filter 512 to remove any interference from signal D2. Exciter 502 is provided with a filter 514 to remove any interference from signal D1. Both exciters 500 and 502 include pre-correction circuitry that pre-corrects the information signal supplied to antenna to correct for any distortion caused by the filters in the combiner-filter 400'. The pre-correction may be for both non-linear and linear distortions. Preferably the correction is for at least any linear distortion introduced by the filters in the filter-combiner 400'. As shown, the correction may be adaptive with a feedback path. The correction may also be non-adaptive, without the feedback path.

FIGS. 15 through 23 illustrate many of the features of the response characteristics of the filter described herein. These are specifically related to operation of the embodiment illustrated in FIG. 8 when operating with adjacent channels in an N+1 case.

Figure 15:
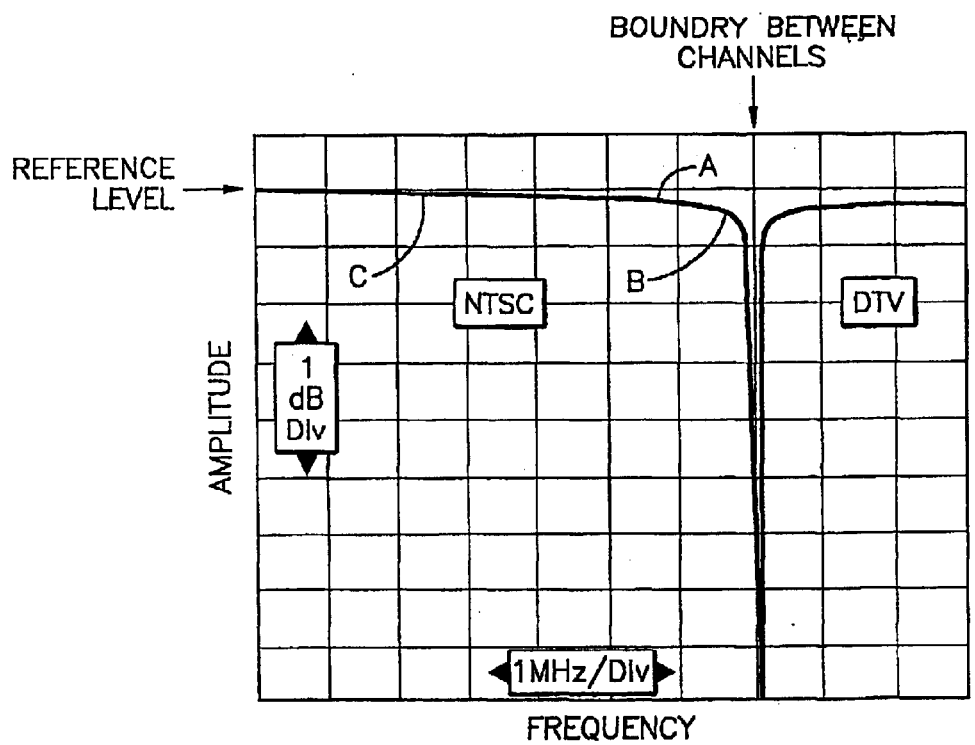
FIG. 15 is a graphical illustration of amplitude with respect to frequency that show the lower adjacent channel response in an N+1 case.

FIG. 15 illustrates the response curve between the NTSC and the DTV passband zones. The sharp tuned characteristic is evident in the very close frequency spacing. Note the video frequency points marked as A, B and C. Point A is the chroma carrier at 3.58 MHz above the visual carrier, point B is the video upper band edge at 4.2 MHz above the visual carrier which is attenuated only −0.4 dB and point C is the reference visual carrier and shows little attenuation at the upper sideband frequencies around the chroma zone.

Figure 16:
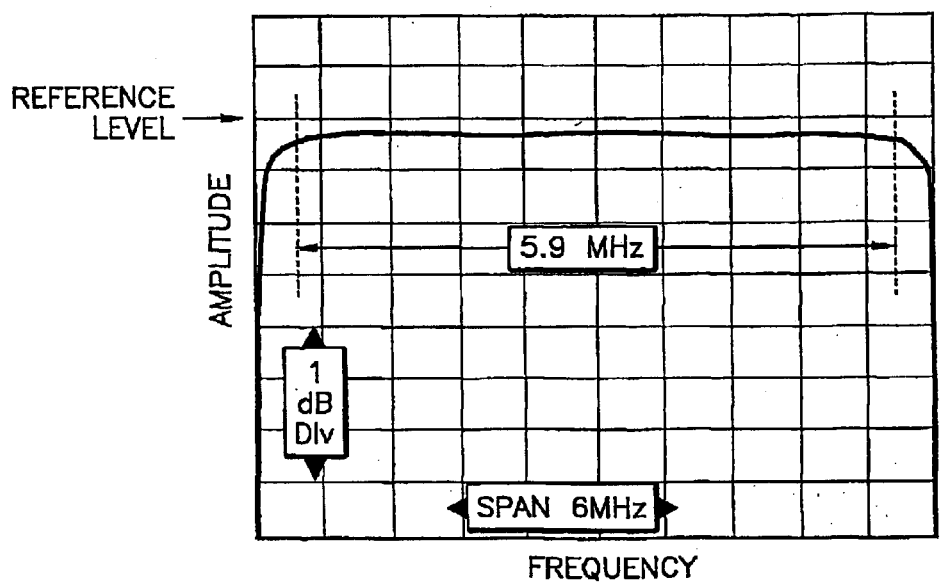
FIG. 16 is a graphical illustration of amplitude with respect to frequency illustrating the DTV bandpass amplitude response.

FIG. 16 illustrates the DTV bandpass showing useful in-band zone covering an inner span of 5.9 MHz. The amplitude response just beyond 5.9 MHz shows a rapid down turn in the response as the effect of the filter becomes apparent. This is a very sharp roll off and is beneficial for removing out of band IMD distortion products.

Figure 17:
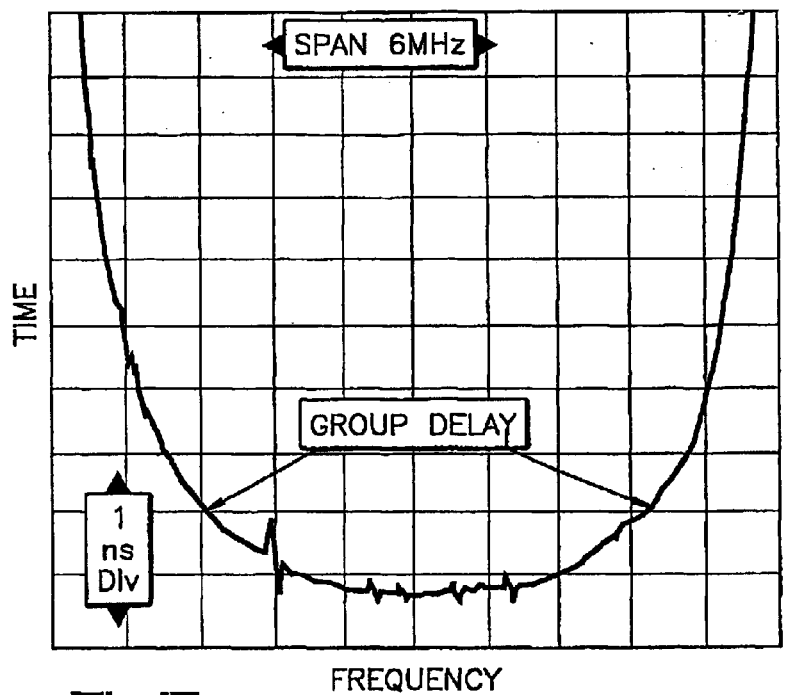
FIG. 17 is a graphical illustration of time in nanoseconds with respect to frequency illustrating the group delay response of the sharp tuned filter.

FIG. 17 is a graphical illustration of time with respect to frequency illustrating a typical group delay response of the DTV bandpass of the filter herein.

Figure 18:
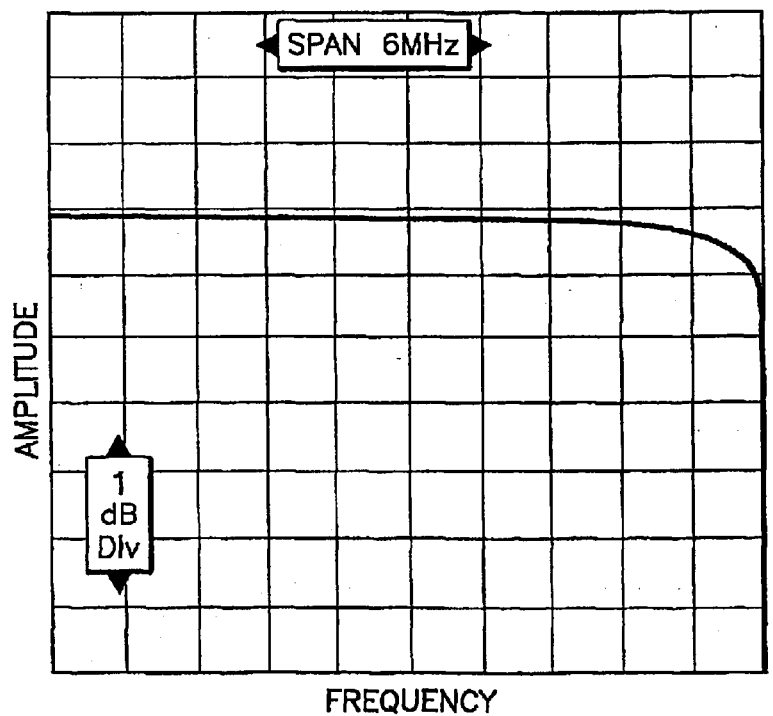
FIG. 18 is a graphical illustration of amplitude with respect to frequency showing the video response of the filter herein.

FIG. 18 is a graphical illustration of amplitude with respect to frequency showing the video response of the filter relative to the lower adjacent channel (NTSC) and shows little attenuation at the upper sideband frequencies around the chroma zone.

Figure 19:
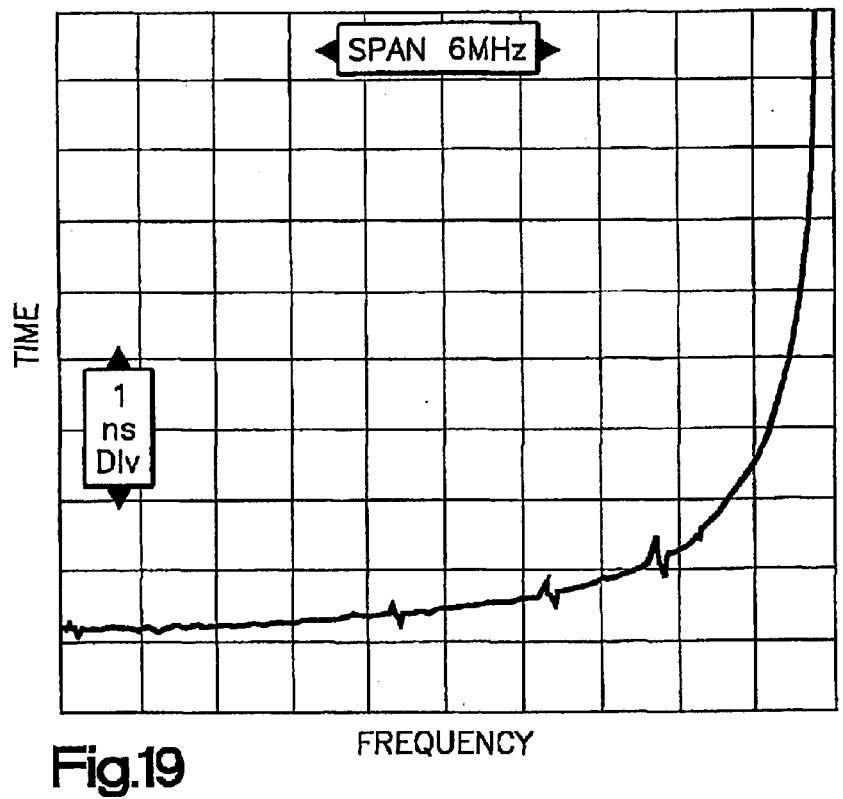
FIG. 19 is a graphical illustration of time in nanoseconds with respect to frequency illustrating the video group delay of the sharply tuned filter the reduction in the equalization requirement of the transmitter.

FIG. 19 is a graphical illustration of time with respect to frequency showing the group delay characteristics of the lower adjacent channel.

Figure 20:
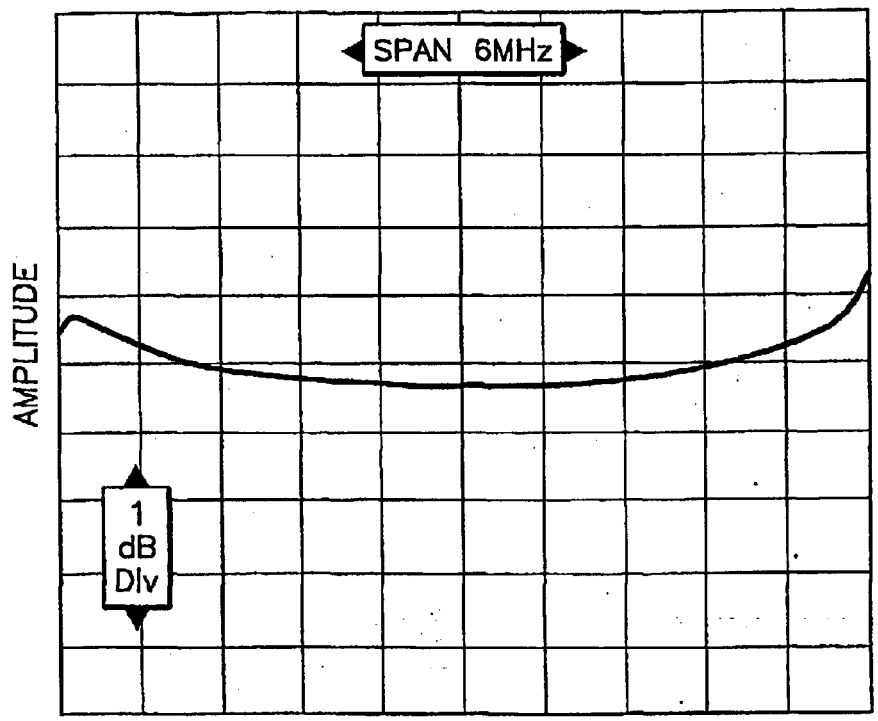
FIG. 20 is a graphical illustration of amplitude with respect to frequency showing improved isolation.

FIG. 20 is a graphical illustration of amplitude with respect to frequency and shows the improved isolation needed for satisfactorily combining NTSC and DTV signals.

Figure 21:
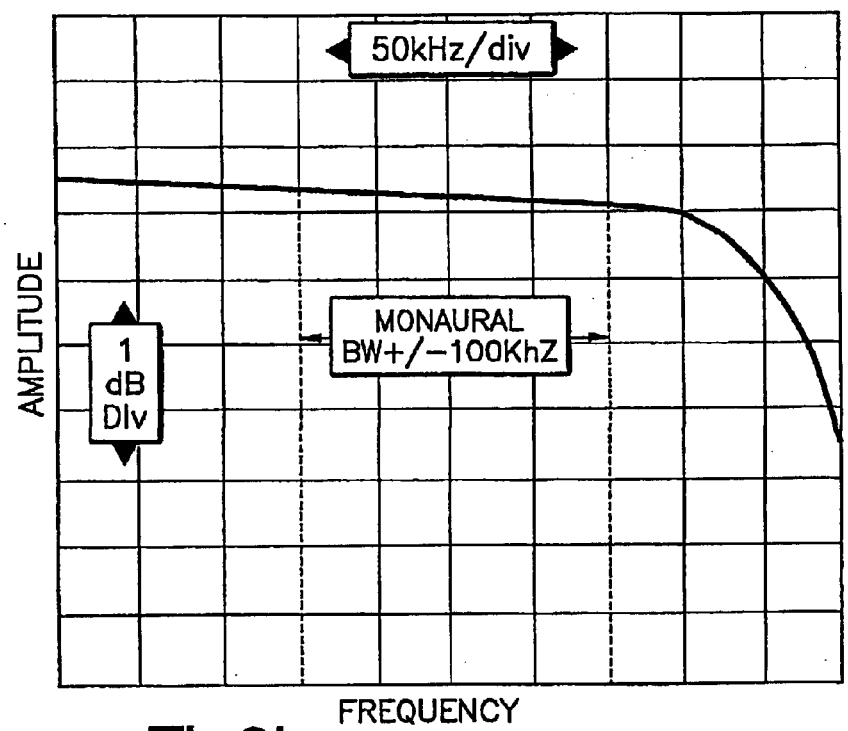
FIG. 21 is a graphical illustration of amplitude with respect to frequency illustrating the monaural amplitude response of a sharp tuned filter.
Figure 22:
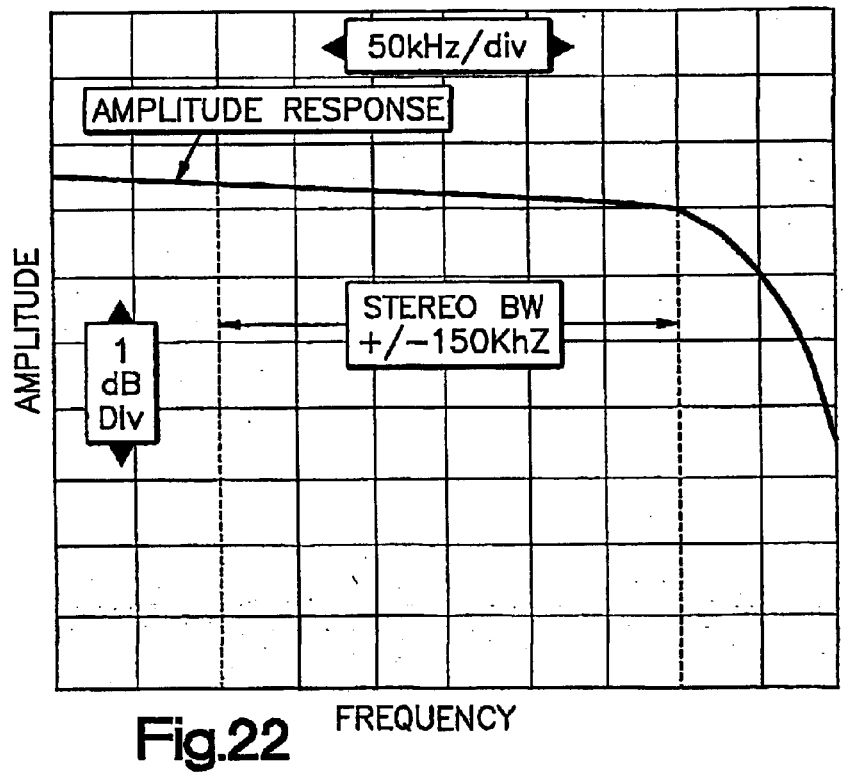
FIG. 22 is a graphical illustration of amplitude, with respect to frequency showing a stereo signal amplitude response of the filter herein.
Figure 23:
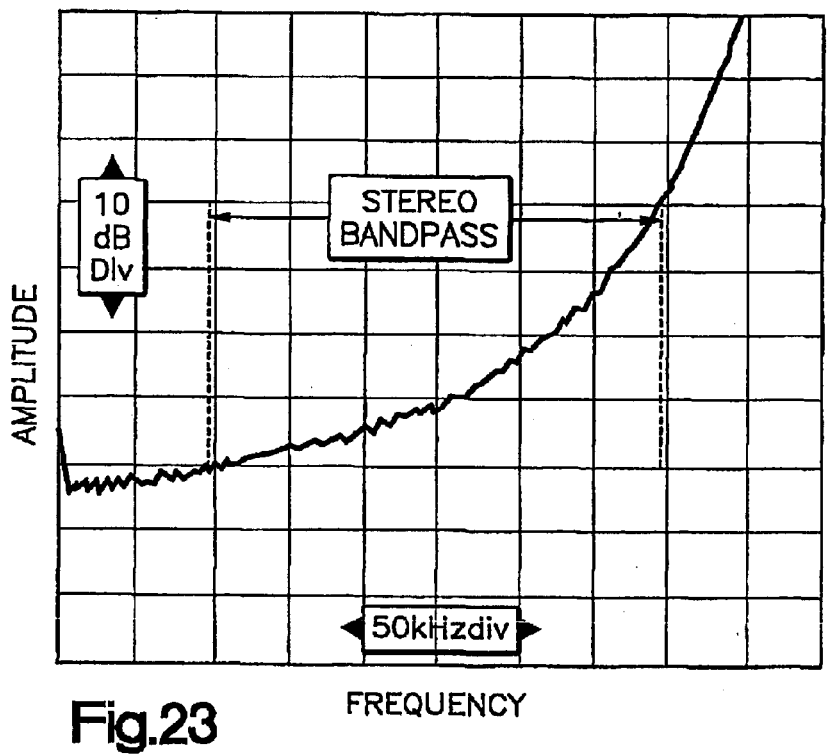
FIG. 23 is a graphical illustration of time with respect to frequency showing a stereo signal group delay response of the filter herein.

FIGS. 21, 22 and 23 illustrate audio performance aspects of the sharply tuned filter.

FIG. 21 is a graphical illustration of amplitude versus frequency and the monaural bandwidth and which is expanded from that illustrated herein at FIG. 15.

FIG. 22 shows the stereo bandwidth.

FIG. 23 is a graphical illustration of time with respect to frequency showing the typical group delay characteristics of the audio path in the filter-combiner herein.

FCC Mask Compliance

The FCC rules state, in part, "in the first 500 kHz from the authorized channel edge, transmitter emissions must be attenuated no less than 47 dB below the average transmitted power".

Figure 24:
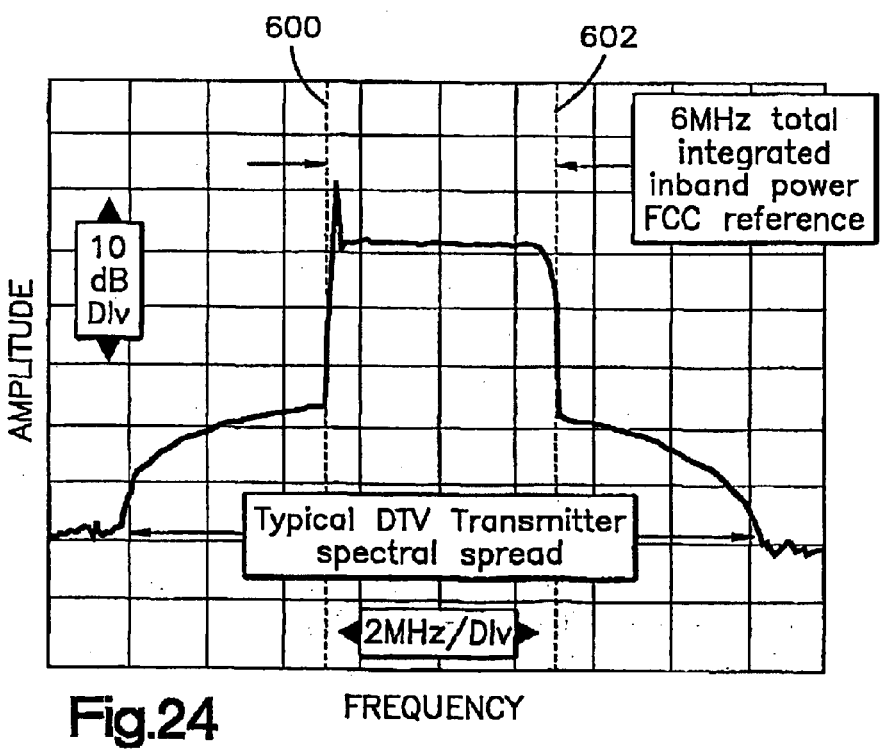
FIG. 24 is a graphical illustration of amplitude with respect to frequency showing a typical transmitter spectral spread of a DTV signal.

Reference is now made to FIG. 24 which illustrates a typical DTV transmitter spectral spread known in the prior art. The total integrated power between the vertical dotted lines 600 and 602 is the reference power for determining if the −47 dB requirement is met in the adjacent 0.5 MHz zones.

Figure 25:
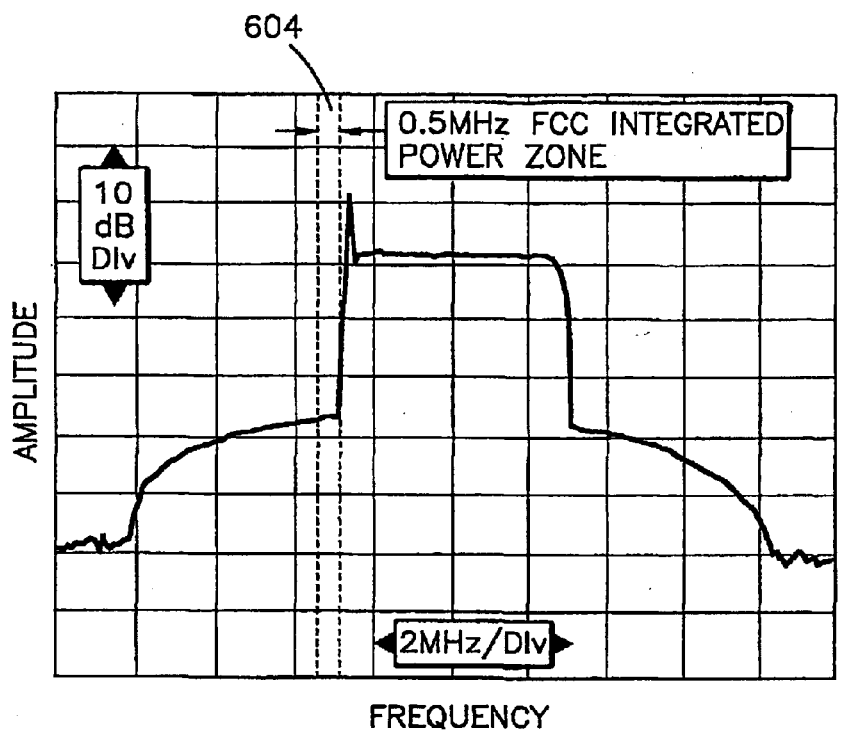
FIG. 25 is a graphical illustration similar to that of FIG. 24 but showing the 0.5 MHz FCC integrated power zone.

FIG. 25 illustrates the 0.5 MHz zone 604 of the typical DTV transmitter spectral spread illustration of the prior art. It is to be noted that spectral spread illustration of FIG. 25 is without the employment of a sharp tuned filter, such as filter 100 described herein with reference herein to FIG. 4 as well as with reference to the other versions illustrated in FIGS. 7, 8, 11, 13 and 14. To the contrary, the illustration in FIG. 25 is representative of the prior art and it is clear that this does not meet the FCC −47 dB requirement.

Figure 26:
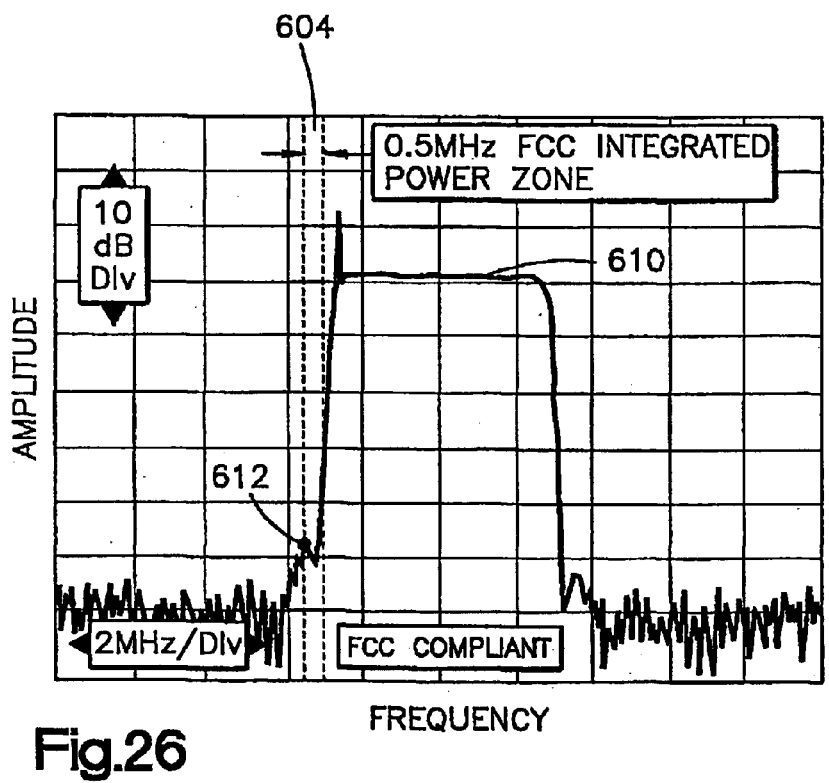
FIG. 26 is a graphical illustration similar to that of FIGS. 23 and 24 but illustrating the operation of a transmitter employing a sharp tuned filter constructed in accordance with the invention herein.

Attention is now directed to the graphical illustration in FIG. 26 of amplitude with respect to frequency showing the spectral spread when the sharp tuned filter 100 described herein is employed. At the location of the FCC 0.5 MHz adjacent zone 604, the power is −51 dB below the in-band power level 610. Clearly, this shows FCC mask compliance as more than the −47 dB level has been met noting specifically location 612 in the illustration of FIG. 26.

Moreover, it is noted from FIG. 26 that the filter herein provides significant reduction of out of band spectrum components.

Power Enhancement

Figure 27:
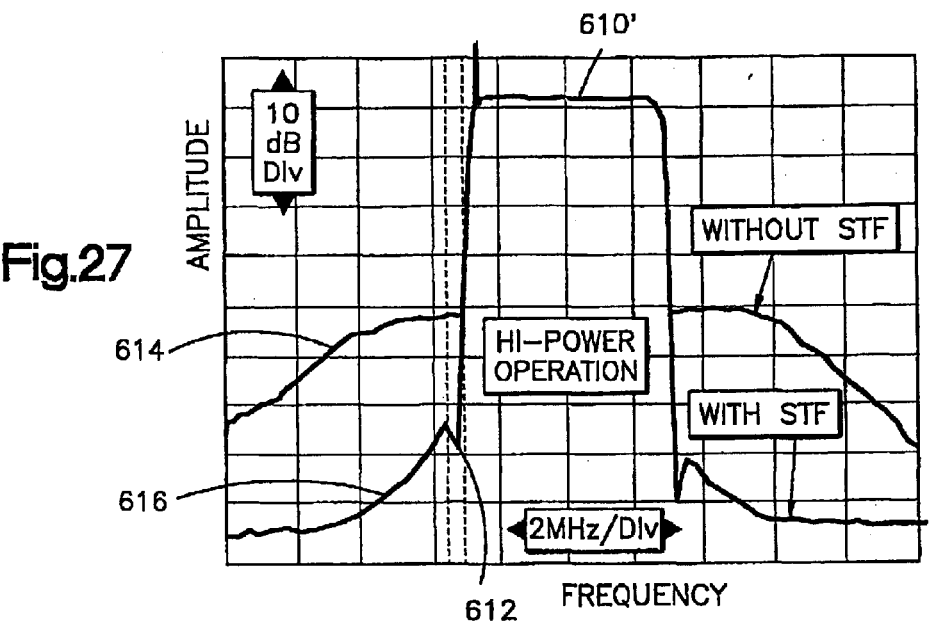
FIG. 27 is similar to FIGS. 24–26 but illustrating an enhanced high power operation of a transmitter without a sharp tuned filter and with a sharp tuned filter constructed in accordance with the filter described herein.

Reference is now made to FIG. 27 which illustrates at curve 614, the IMD (intermodulation distortion) sideband suppression characteristic without employing the sharply tuned filter herein. Curve 616 illustrates the sideband suppression characteristic with the sharp tuned filter herein when an IOT transmitter is operating at about 30% above normal power readings (note that the in-band power level 610' in FIG. 27 is about 30% greater than in-band power level 610 in FIG. 26).

Figure 28:
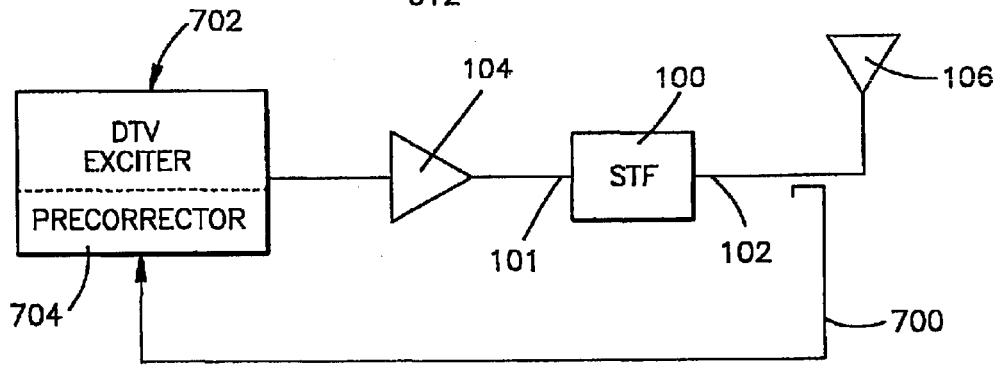
FIG. 28 is a block diagram similar to FIG. 4 but including a feedback path and an exciter.
Figure 29:
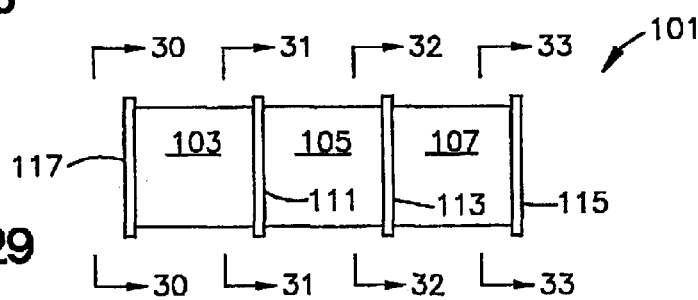
FIG. 29 is an elevational view illustrating a waveguide that may be employed in practicing the invention herein.

Reference is now made to FIG. 28 which is similar to FIG. 4, but includes an adaptive feedback path 700 and a DTV exciter 702. The exciter 702 includes a pre-corrector circuit 704 that pre-corrects the information signal supplied to antenna or load 106 to correct for any distortion caused by the filter 100. The pre-correction may be for both non-linear and linear distortions. Preferably the pre-correction is for at least any linear distortion introduced by the filter 100. As shown the pre-correction may be adaptive with a feedback path. The pre-correction may also be non-adaptive, without the feedback path. The pre-correction should compensate for any linear distortion, such as any ripple in the in-band power level 120 in FIG. 5 caused by filter 100 during such higher power operation noted in the waveform of FIG. 27.

Summation

1. A sharp tuned bandpass filter (STF) is a key element in a TV combining system for adjacent channel allocations where special techniques are required to combine very closely spaced channels. Current industry techniques use a set of notch diplexing cavities on the NTSC aural carrier in a constant impedance configuration to combine adjacent, upper or lower, DTV channels with an NTSC channel. The filter-combiner described herein at FIG. 8 uses a set of sharp tuned filters to do a very effective job of combining the NTSC and DTV signals with significantly enhanced performance on the NTSC.
2. The NTSC aural performance is improved with nearly double the bandwidth of the notch cavity diplexing approach. This avoids sideband cutting of the "PRO Channel" and group delay and amplitude distortion of the SAP and BTSC Stereo subchannels. The notch diplexing approach introduces an "S" curve in the group delay response which makes it very difficult to correct. In addition, the amplitude response is sloped off in an asymmetrical manner further complicating the overall correction of the aural carrier. The sharp tuned filter herein eliminates "S" curve response problems with a soft group delay response that in many cases doesn't need correction or very little of it.
3. Video performance is enhanced with very little amplitude distortion and only mild group delay distortion which can be easily corrected. This is unlike the notch diplexing system that requires amplitude and delay correction circuits to restore the severe amplitude roll off of the 4.2 MHz burst flag due to the notch cavities. The sharp tuned filter system needs only modest group delay correction to restore the 12.5 T pulse performance that can be easily accomplished with existing analog circuits.
4. The DTV to NTSC isolation characteristic is significantly degraded in the notch cavity system which causes high frequency bleed through of DTV components into the NTSC channel. The sharp tuned filter system described herein does not have this problem and provides a flat, uniform isolation value of about −35 dB over the video band.
5. The specified response and attenuation values shown herein provide the necessary symmetry in the DTV channel for elementary adaptive group delay and amplitude response correcting circuits to achieve automatic adaptive correction without losing control. The symmetry issue as specified is an important issue to reach the standard accepted error vector magnitude for DTV transmission.
6. The sharp tuned filter approach can combine adjacent channel DTV signals.
7. The attenuated point at +/−0.25 MHz off the upper and lower edge of the filter provides additional attenuation to meet the FCC out of band mask when the transmitter power is increased to a point where the spectral spread shoulder level can be as great as −30 dB. Full mask compliance can therefore be obtained when the DTV transmitter is operated at higher than normal power levels for enhanced efficient operation. The sharp tuned filter herein provides this characteristic. The benefit of higher power operation while maintaining FCC mask compliancy is a significant advantage.
8. The sharp tuned filter system with the attenuation specification shown herein exceeds the current FCC mask requirements and provides further sideband reduction for noticeably improved interference free operation on adjacent NTSC channels.
9. The system design concept of using a sharp tuned filter system for the unique application of adjacent upper or lower DTV channel combining with an NTSC station, only recently allocated by the FCC, with the performance as stated above.
10. A sharp tuned filter system causes very little group delay and amplitude errors over the video pass band and in particular, has a very smooth response curve over the aural pass band to maintain good BTSC performance and low synchronous AM.
11. The filter-combiner herein can combine adjacent DTV channels. An adaptive system can be connected to the system for adaptive correction on each independent DTV path. A special filter in the adaptive sample back line can be used in the exciter to filter out the adjacent DTV interference for excellent dual DTV transmission.
12. The filter herein, however, does restrict the 8VSB bandwidth slightly which is a benefit for reduced adjacent channel interference but does not cause any reduced performance on DTV receivers. There is no measurable change in DTV receiver threshold levels, hence no coverage loss. Transmitter EVM performance remains excellent.

From the above description, those skilled in the art will perceive improvements, changes and modifications. Such improvements, changes and modifications within the skill of the art are intended to be covered by the appended claims.

I claim:

1. A sharply tuned bandpass RF filter,
   said filter having an input port for receiving digital television RF signals and passing same to an output port of said filter for application to a load;

said filter being tuned such that it exhibits the characteristic of passing only RF signals having frequencies within a given frequency channel out of a plurality of channels all having the same frequency bandwidth while rejecting all other frequencies;

said bandwidth of each said channel being on the order of W MHz;

said filter exhibiting an amplitude response within a mandated digital television signal mask such that when operated in an RF transmitter the amplitude of the response is attenuated uniformly about the center frequency of said given channel within a frequency range of about ±0.5W MHz to a maximum of about ±(0.5W+ 0.45) MHz and extending to an attenuated level of about −1 to −18 dB from the in-band power level.

2. A filter as set forth in claim 1 wherein W is in the range from about 6.0 MHz to about 8.0 MHz.

3. A filter as set forth in claim 1 wherein W=6.0 MHz.

4. A filter as set forth in claim 3, wherein said mandated mask is the Federal Communications Commission (FCC) mask for the 8VSB standard.

5. A filter as set forth in claim 4 wherein said mandated mask requires that the amplitude response be at ±3.5 MHz about said center frequency at the in-band power level and extend therefrom in a skirt like fashion to a level of about −64 dB at ±9.0 MHz.

6. A filter as set forth in claim 5 wherein the maximum amplitude response of said filter extends from said attenuated level to a level of about −40dB to −64 dB at about ±9.0 MHz within said mandated mask.

7. A filter as set forth in claim 6 wherein the maximum amplitude response of said filter extends from said attenuated level in a skirt like fashion.

8. A filter as set forth in claim 7 wherein said skirt like fashion varies in a linear manner.

9. A filter as set forth in claim 6 wherein said filter exhibits the characteristic of maintaining the amplitude of any variations in the magnitude of said in-band power level within about 0.5 dB.

10. A filter as set forth in claim 6 wherein said filter exhibits the characteristic of maintaining any insertion loss within about −0.20 dB from said in-band power level.

11. A filter as set forth in claim 6 wherein said given frequency channel has a channel edge and that said filter exhibits the characteristic of attenuating any emitted power within 0.5 MHz from said channel edge by an amount greater than −47 dB below said in-band power level.

12. A filter as set forth in claim 1 in combination with a power amplifier located upstream from said filter and a pre-corrector located upstream from said power amplifier to compensate for any signal distortions that may be introduced by said filer.

13. A filter as set forth in claim 12 wherein said pre-corrector is a pre-corrector that compensates for any linear in-band distortions that may be introduced by said filter.

14. A filter as set forth in claim 1 in combination with a power amplifier and a DTV exciter that provides a DTV signal as said given frequency channel for amplification by said power amplifier with the amplified DTV signal being applied to said filter, said filter having an output port for providing a filtered amplified output DTV signal.

15. A filter as set for in claim 14 wherein said exciter includes a pre-corrector for pre-correcting said DTV signal to compensate for any distortions that may be introduced by said filter.

16. A filter as set forth in claim 15 wherein said pre-corrector compensates for any linear in-band distortions that may be introduced by said filter.

17. A filter as set forth in claim 16 including a signal sampler that obtains a sample of said filtered amplified output DTV signal, a feedback network that feeds said sample to said pre-corrector for adaptively compensating for any distortions introduced by said filter.

* * * * *